United States Patent
Kim et al.

(10) Patent No.: US 7,020,064 B2
(45) Date of Patent: Mar. 28, 2006

(54) REWRITABLE DATA STORAGE USING CARBONACEOUS MATERIAL AND WRITING/READING METHOD THEREOF

(75) Inventors: Byong-man Kim, Gupo (KR); Yo-sep Min, Yongin (KR); Jo-won Lee, Suwon (KR); Nae-sung Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 986 days.

(21) Appl. No.: 09/852,300

(22) Filed: May 10, 2001

(65) Prior Publication Data
US 2002/0009632 A1    Jan. 24, 2002

(30) Foreign Application Priority Data
May 10, 2000   (KR) ................................. 2000-25043

(51) Int. Cl.
*G11B 9/00*    (2006.01)
(52) U.S. Cl. ....................................... 369/126; 369/288
(58) Field of Classification Search ................. 369/94, 369/126, 283, 288, 275.5, 47.5, 47.51; 428/64.4, 428/64.5, 64.6
See application file for complete search history.

(56) References Cited

U.S. PATENT DOCUMENTS

| | | | |
|---|---|---|---|
| 4,550,257 A | 10/1985 | Binniig et al. | |
| 5,036,490 A | 7/1991 | Kajimura et al. | |
| 5,043,578 A * | 8/1991 | Guthner et al. ............. | 369/101 |
| 5,047,649 A | 9/1991 | Hodgson et al. | |
| 5,162,819 A * | 11/1992 | Sakai et al. .................. | 347/112 |
| 5,216,631 A | 6/1993 | Sliwa, Jr. | |
| 5,241,527 A * | 8/1993 | Eguchi et al. .............. | 369/126 |
| 5,313,451 A * | 5/1994 | Yagi et al. ................... | 369/126 |
| 5,373,494 A | 12/1994 | Kawagishi et al. | |
| 5,389,475 A * | 2/1995 | Yanagisawa et al. ....... | 250/307 |
| 5,402,410 A | 3/1995 | Yoshimura et al. | |
| 5,581,538 A * | 12/1996 | Inui et al. .................... | 369/126 |
| 5,610,898 A * | 3/1997 | Takimoto et al. ........... | 369/126 |
| 6,197,399 B1 * | 3/2001 | Naito et al. ................. | 428/64.1 |

FOREIGN PATENT DOCUMENTS

| | | |
|---|---|---|
| EP | 0 325 056 A2 | 7/1989 |
| EP | 0 665 541 A2 | 8/1995 |
| EP | 0 665 541 A3 | 8/1995 |
| JP | 8-315433 | 11/1996 |

OTHER PUBLICATIONS

"Very High Density Ram", IBM Technical Disclosure Bulletin, vol. 37, No. 9, p. 355 (Sep. 1, 1994).
Patent Abstracts of Japan, vol. 013, No. 370 (Aug. 17, 1989) [JP-01-125746].

* cited by examiner

Primary Examiner—Paul W. Huber
(74) Attorney, Agent, or Firm—Lee & Morse, P.C.

(57) ABSTRACT

A rewritable data storage using a carbonaceous material writes or erases information represented by the carbonaceous material by means of a current induced electrochemical reaction on a conductive layer, by controlling a voltage applied across the space between a cantilever tip and the conductive layer. Also, the size of the carbonaceous material representing information is controlled by the level of the applied voltage or the application duration.

16 Claims, 8 Drawing Sheets

REWRITABLE DATA STORAGE USING CARBONACEOUS MATERIAL AND WRITING/READING METHOD THEREOF

BACKGROUND OF THE INVENTION

1. Field of the Invention

The present invention relates to a rewritable data storage and a writing/reading method thereof and, more particularly, to a rewritable data storage using a carbonaceous material formed by controlling a bias voltage applied between a micro tip and a storage substrate and a writing/reading method thereof.

2. Description of the Related Art

Conventional data storage methods include a ferroelectric substance polarization method, a polymer thermal transformation method, a magnetic substance phase transformation method, a resistant substance phase transformation method, a phase transformation method by oxidizing a metal or a semiconductor, and so on, and while there are certain advantages associated with each type of method, there are drawbacks with respect to writing time, data maintenance, and so on.

Some of these conventional methods are not rewritable, and even if the methods are rewritable, there are inevitable problems associated with deterioration of material features caused by write/erase cycles in which the recording medium undergoes phase transformation and, hence, results in low endurance.

SUMMARY OF THE INVENTION

To solve these and other problems, it is a feature of the present invention to provide a rewritable data storage using a carbonaceous material in which problems associated with low endurance and deterioration of material features caused by phase transformation are avoided. It is an additional feature of the present invention to provide a writing/reading method using the rewritable data storage of the present invention.

In accordance with these and other features of the present invention, there is provided a rewritable data storage using a carbonaceous material, comprising a writing plate formed of a substrate, a conductive layer deposited on the substrate, and a tip for forming or eliminating carbonaceous material in the form of spots on the writing plate, the spots representing information recorded on the conductive layer. Preferably, the substrate is formed of $SiO_2/Si$, the conductive layer is formed by depositing Au, and the tip is formed by coating Ti on a tip-shaped Si core.

In accordance with another feature of the present invention, there is provided a rewritable data storage using a carbonaceous material, comprising a writing plate comprised of a substrate, striped conductive layer patterns formed on the substrate, a tip disposed in an array having a regular interval corresponding to the striped conductive layer patterns along a cantilever extending across the striped conductive layer patterns in order to form or eliminate carbonaceous material in the form of spots representing information recorded on the conductive layer patterns.

In accordance with another feature of the present invention, there is provided a method of writing/reading to a rewritable data storage using a carbonaceous material according to the present invention, the rewritable data storage including a writing plate formed of a substrate, a conductive layer formed on the substrate, and a tip for forming or eliminating a carbonaceous material in the form of spots representing information recorded on the conductive layer, the method of writing/reading including: (a) writing information by applying a predetermined bias voltage to a space between the tip and the conductive layer, and forming the carbonaceous material on the conductive layer, (b) erasing the information by applying a voltage of reverse polarity to the bias voltage applied in the step of writing to the space between the tip and the conductive layer, and eliminating the carbonaceous material already formed, and (c) reading the information by deciphering topography between the conductive layer and the carbonaceous material.

In the method of writing/reading according to the present invention, the spot size of the carbonaceous material formed in step (a) is determined by two factors: the magnitude of the bias voltage applied across the space between the conductive layer and the tip, and the time duration for which the bias voltage is applied. Likewise, the size of the spot of the carbonaceous material eliminated in step (b) is determined by two factors: the magnitude of the bias voltage applied across the space between the conductive layer and the tip, and the time duration for which the bias voltage is applied. In step (c), reading is preferably performed using one of a capacitance difference, a resistance difference, a frictional coefficient difference, and a height difference between the conductive layer and the carbonaceous material.

In accordance with another feature of the present invention, there is provided a method of writing/reading a rewritable data storage having a carbonaceous material according to the present invention, the rewritable data storage having a writing plate comprising a substrate on which striped conductive layer patterns are formed by depositing a conductor on the substrate, and a tip disposed in an array having a regular interval to correspond to the striped conductive layer patterns in a cantilever extending across the striped conductive layer patterns in order to form or eliminate a carbonaceous material in the form of spots representing information recorded on the conductive layer patterns, the method of writing/reading comprising: (a) writing information by positioning the cantilever, applying a predetermined bias voltage to the space between the tip of the cantilever and the selected conductive layer pattern and forming a carbonaceous material spot in a selected region on the selected conductive layer pattern; (b) erasing the information by positioning the cantilever, applying a voltage of reverse polarity to the bias voltage applied in the writing step to the space between the tip of the cantilever and the selected conductive layer pattern and eliminating the carbonaceous material already formed, and (c) reading the information by deciphering topography between the conductive layer pattern and the carbonaceous material.

Again, the size of the spot of the carbonaceous material formed in step (a) is determined by controlling the magnitude of the bias voltage applied across the space between the conductive layer pattern and the tip of the cantilever, and also by the time duration for which the bias voltage is applied. Also, the size of the spot of the carbonaceous material eliminated in step (b) is determined by controlling the magnitude of the bias voltage applied across the space between the conductive layer pattern and the tip of the cantilever, and by the time duration for which the bias pattern is applied. Reading the information in step (c) is preferably determined by using one of a capacitance difference, a resistance difference, a frictional coefficient difference, and a height difference between the conductive layer pattern and the carbonaceous material.

BRIEF DESCRIPTION OF THE DRAWINGS

The above features and advantages of the present invention will become more apparent by describing in detail preferred embodiments thereof with reference to the attached drawings in which:

FIGS. 1A and 1B are schematic diagrams showing the basic structure and operational principles of a rewritable data storage using a carbonaceous material according to an embodiment of the present invention, wherein:

FIG. 1A shows a writing step; and

FIG. 1B shows an erasing step.

FIGS. 2A through 2D are images of a carbonaceous material actually formed using the principle illustrated in FIGS. 1A and 1B, the images having been obtained with the aid of an atomic force microscope (AFM), wherein:

FIG. 2A shows an image of a rectangular carbon microstructure after writing the rectangular carbon microstructure on a metal layer by applying −6 V to a tip;

FIG. 2B shows an image of the rectangular carbon microstructure after erasing a part of the rectangular carbon microstructure shown in FIG. 2A (a black part of the center) by applying +5 V to the tip;

FIG. 2C shows an image of the rectangular carbon microstructure after the rectangular carbon microstructure shown in FIG. 2B is read by applying +5 V to the tip and erasing three parts of the spot information; and FIG. 2D shows an image of the rectangular carbon microstructure after information in the center that was erased as shown in FIG. 2B (a white point) is rewritten by applying −6 V to the tip.

DETAILED DESCRIPTION OF THE INVENTION

Korean Patent Application No. 00-25043, filed May 10, 2000, entitled "Rewritable data storage using carbonaceous material and writing/reading method thereof," is incorporated herein by reference in its entirety.

Hereinafter, a rewritable data storage using a carbonaceous material and a method of writing/reading thereof according to the present invention will be described in greater detail with reference to the appended drawings.

Figure 1A:
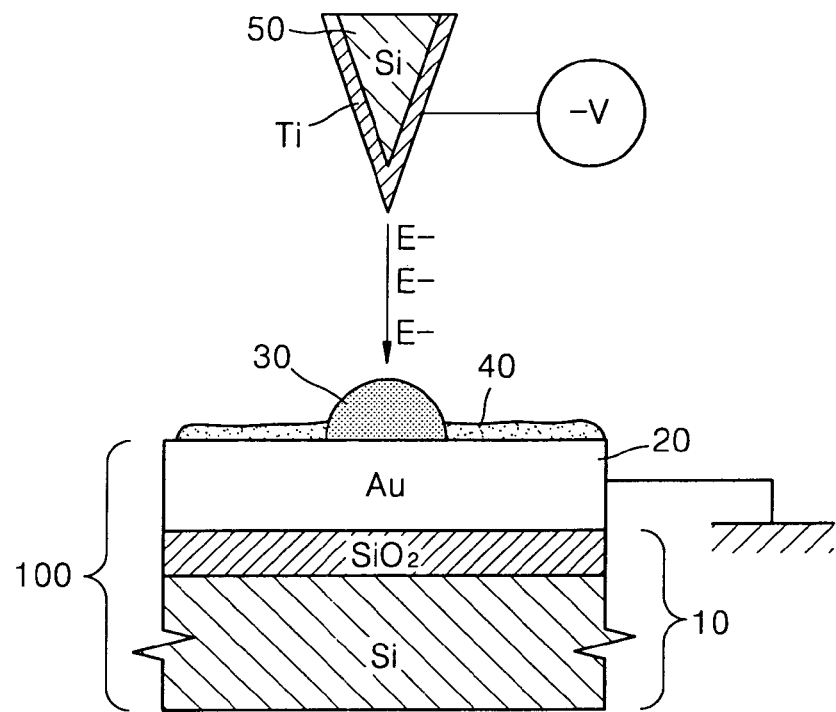
Figure 1B:
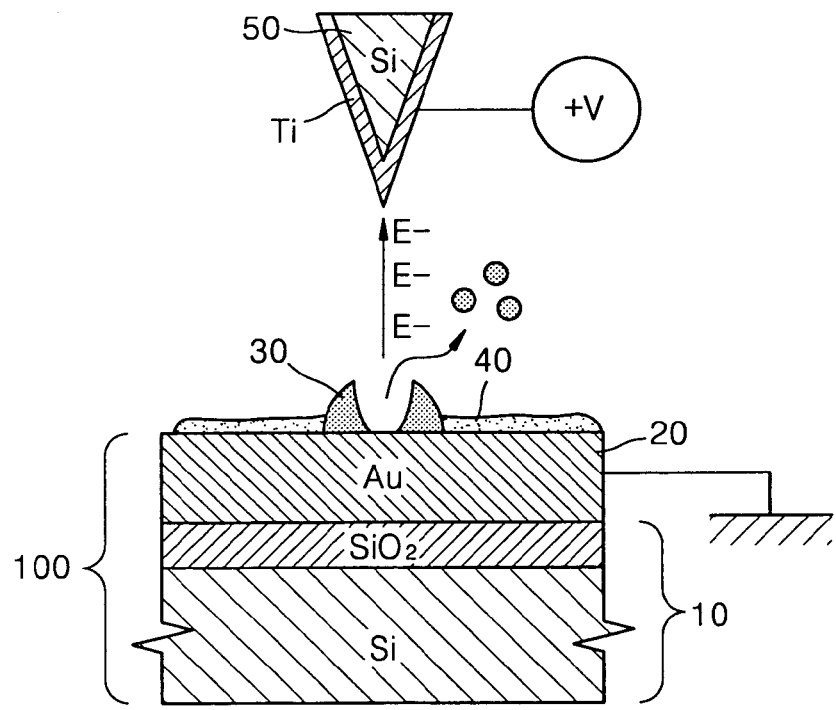

FIGS. 1A and 1B show the basic structure of an embodiment of a rewritable data storage using carbonaceous material according to the present invention. The rewritable data storage includes a substrate, for example, a $SiO_2$ substrate 10, and a $Au/SiO_2/Si$ writing plate 100 formed by depositing a conductive layer 20, for example Au, on the substrate 10. A cantilever tip 50 is provided for forming or eliminating a carbonaceous material 30 in the form of spots representing information recorded on the conductive layer 20. Here, it is preferable to use a scanning probe microscope (SPM) series tip such as an AFM tip for the cantilever tip 50 comprising Ti coated on the surface of a Si cantilever tip. Ambient residual gas species 40, such as $CO_2$, $H_2O$, $O_2$, $N_2$, $CH_4$, may be present in the air adjacent and along the surface of the Au layer.

The rewritable data storage of the above structure employing a carbonaceous material, and the writing/reading method thereof will now be described.

If a bias voltage (V) is applied across the space between the cantilever tip 50 and the $Au/SiO_2/Si$ writing plate 100, carbonaceous material 30 is formed on the Au conductive layer 20. The size of the carbonaceous material spots formed on the $Au/SiO_2/Si$ writing plate 100 changes with changes in the level of the bias voltage applied across the space between the $Au/SiO_2/Si$ writing plate 100 and the cantilever tip 50. Information is read by detecting the shape of the carbonaceous material spots of different sizes.

As illustrated in FIG. 1A, a bias voltage (−V) is applied across the space between the cantilever tip 50 and the conductive layer 20 (an Au layer) of the portion required for writing using the cantilever tip 50 attached to the AFM, and the carbonaceous material 30 is formed on the conductive layer 20. This forming of the carbonaceous material 30 on the conductive layer 20 may be referred to or regarded as a "writing" step.

As illustrated in FIG. 1B, if a bias voltage of the reverse polarity (+V) is applied across the space between the cantilever tip 50 and a portion of the conductive layer 20 (an Au layer) desired to be erased, carbonaceous material 30 from the portion desired to be erased is eliminated. This elimination of the carbonaceous material 30 from a portion of the conductive layer 20 may be referred to or regarded as an "erasing" step.

When reading a record, however, no voltage is applied since only the topography between a deteriorated portion of the surface of the conductive layer (an Au layer) 20 and an intact portion or a difference in material features or a difference in electrical features is detected and read. This step may be referred to or regarded as a "reading" step. Various methods may be employed to execute this reading step by using a difference in physical features of the carbonaceous material 30 formed as spots by the voltage applied across the space between the cantilever tip 50 and the $Au/SiO_2/Si$ writing plate 100, and the original conducive layer (an Au layer) 20.

For example, there are reading methods using topography between the carbonaceous material 30, formed by the bias voltage applied across the space between the cantilever tip 50 and $Au/SiO_2/Si$ writing plate 100, and the original conductive layer portion (an Au layer) 20, a difference in capacitance, a difference in resistance, or a difference in frictional coefficient.

The structural principle of the rewritable data storage using the carbonaceous material as illustrated in FIGS. 1A and 1B will now be described in detail below.

There is provided a writing plate 100 comprising a conductive layer (an Au layer) 20 formed on a $SiO_2/Si$ substrate 10, and a cantilever tip 50 comprising Ti coated on a tip-shaped Si core is disposed above the writing plate 100. Next, a regular voltage is applied across the space between the conductive layer 20 and the cantilever tip 50 of the writing plate, and electrons are emitted into the air (that is, an electric discharge is caused). The emitted electrons locally deposit the carbonaceous material on the conductive layer 20 of the writing plate through an electrochemical reaction with $CO_2$, $H_2O$, $N_2$, $O_2$, $CH_4$, and so on existing in the air on the conductive layer 20 of the writing plate 100.

If the written information is erased, the electrochemical reaction (or a voltage or a current induced electrochemical decomposition/desorption) is caused by applying the voltage of reverse polarity, and the stored carbonaceous material 30 is eliminated from the conductive layer 20.

When reading a difference between written information and erased information, it is read by detecting a difference in topography between the original conductive layer 20 and the grown carbonaceous material 30.

Figure 2A:
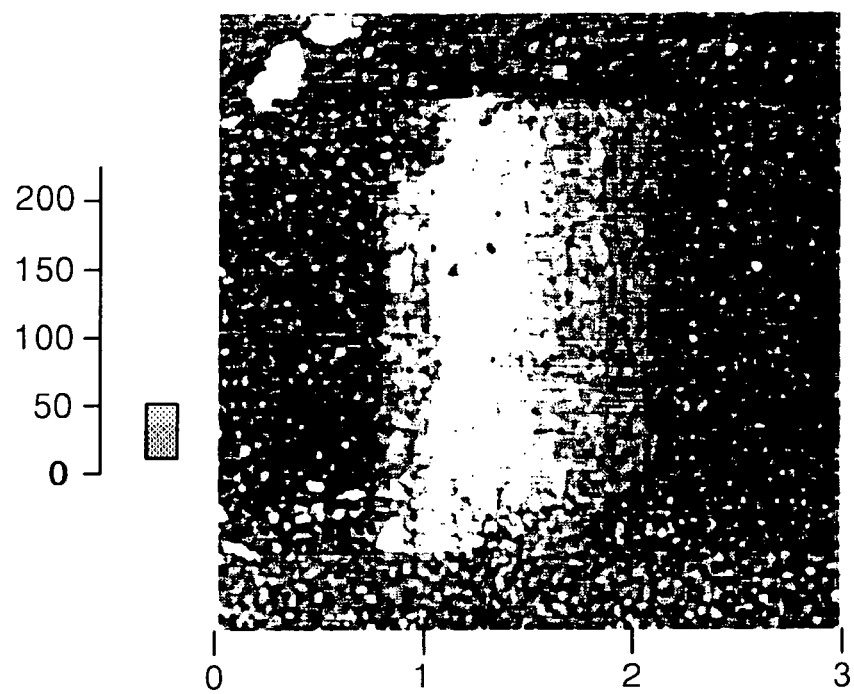
Figure 2B:
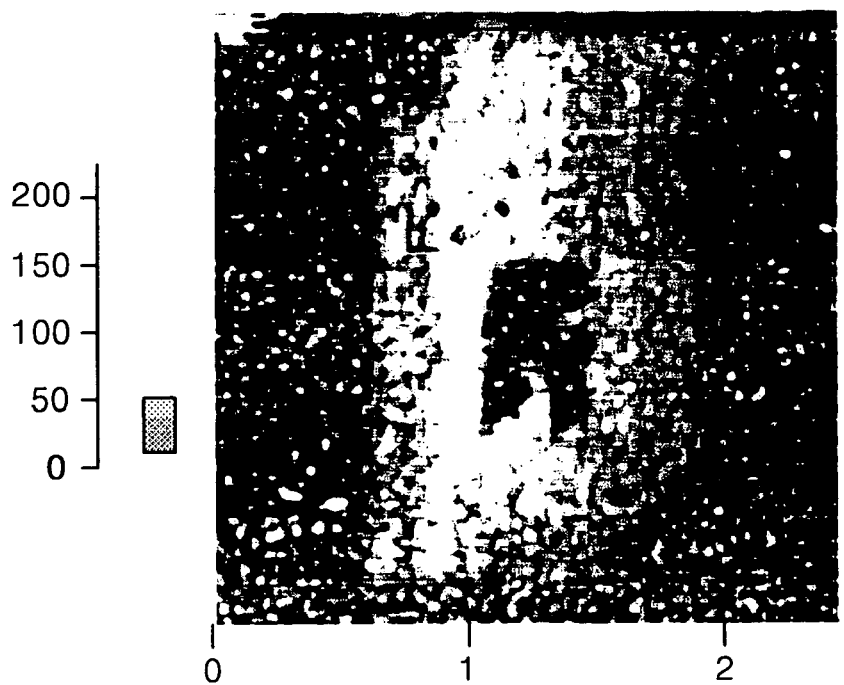
Figure 2C:
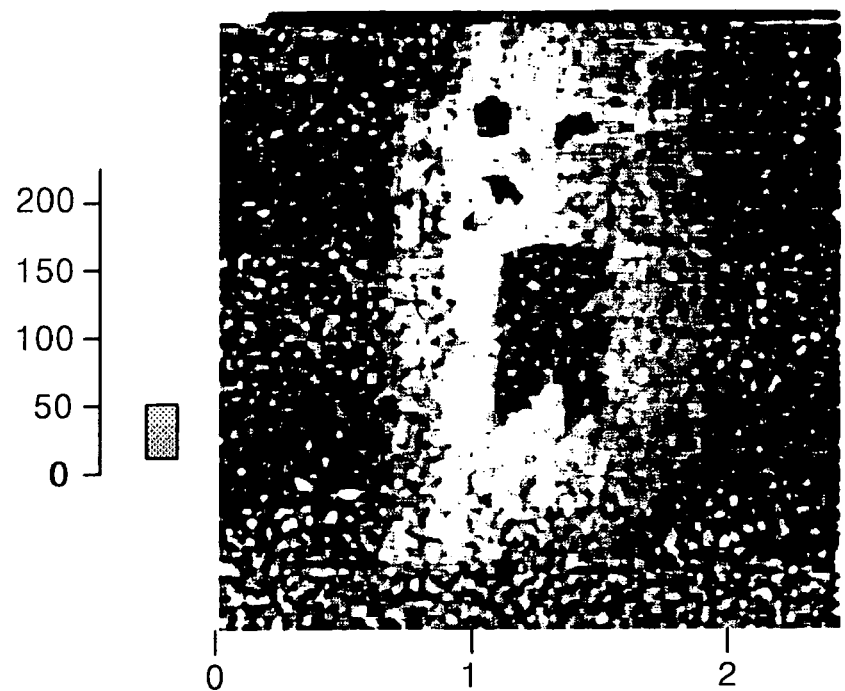
Figure 2D:
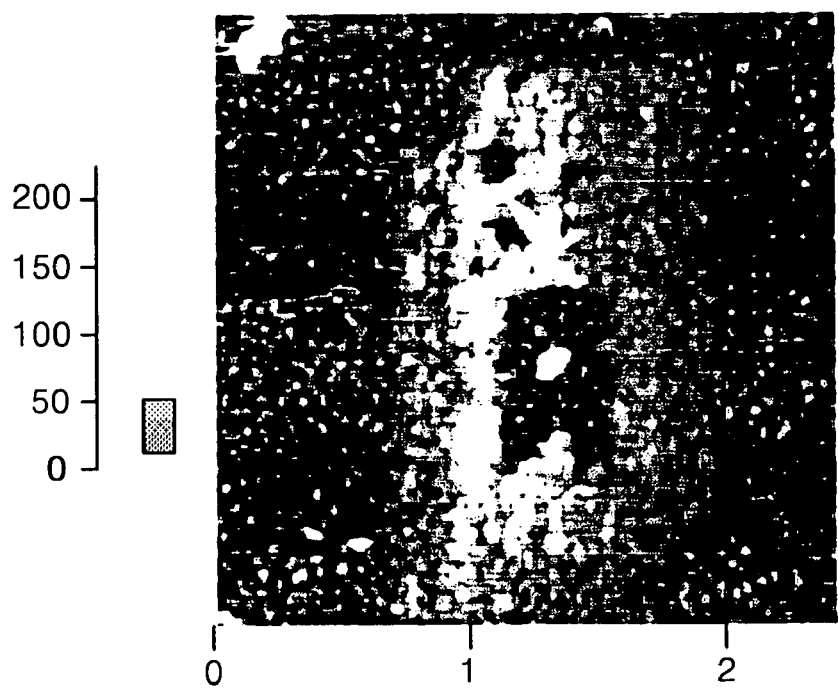

Images of the actually formed carbonaceous materials being read with the AFM are illustrated in FIGS. 2A through 2D. FIG. 2A is an image of a rectangular carbon microstructure being read by applying −6 V to the tip after writing the carbon microstructure on the Au layer. FIG. 2B is an image of the rectangular form of FIG. 2A being read with the AFM after erasing a part, leaving a black part in the center, by applying +5 V to the tip. FIG. 2C is an image of the rectangular structure being read with the AFM after erasing three more parts of the original spot form by applying +5 V to the tip. FIG. 2D is an image of the rectangular structure being read with the AFM after rewriting information (a white point) in the center which was previously erased, by applying −6 V to the tip.

As sequentially illustrated in FIGS. 2A through 2D, the process, wherein the carbonaceous material 30 is formed in a specified region on the writing plate 100 (a conductive layer), the formed material is erased, and then the carbonaceous material is formed again in the same position, can be performed by the polarity transformation of the bias voltage applied across the space between the cantilever tip 50 and the conductive layer 20.

Figure 3:
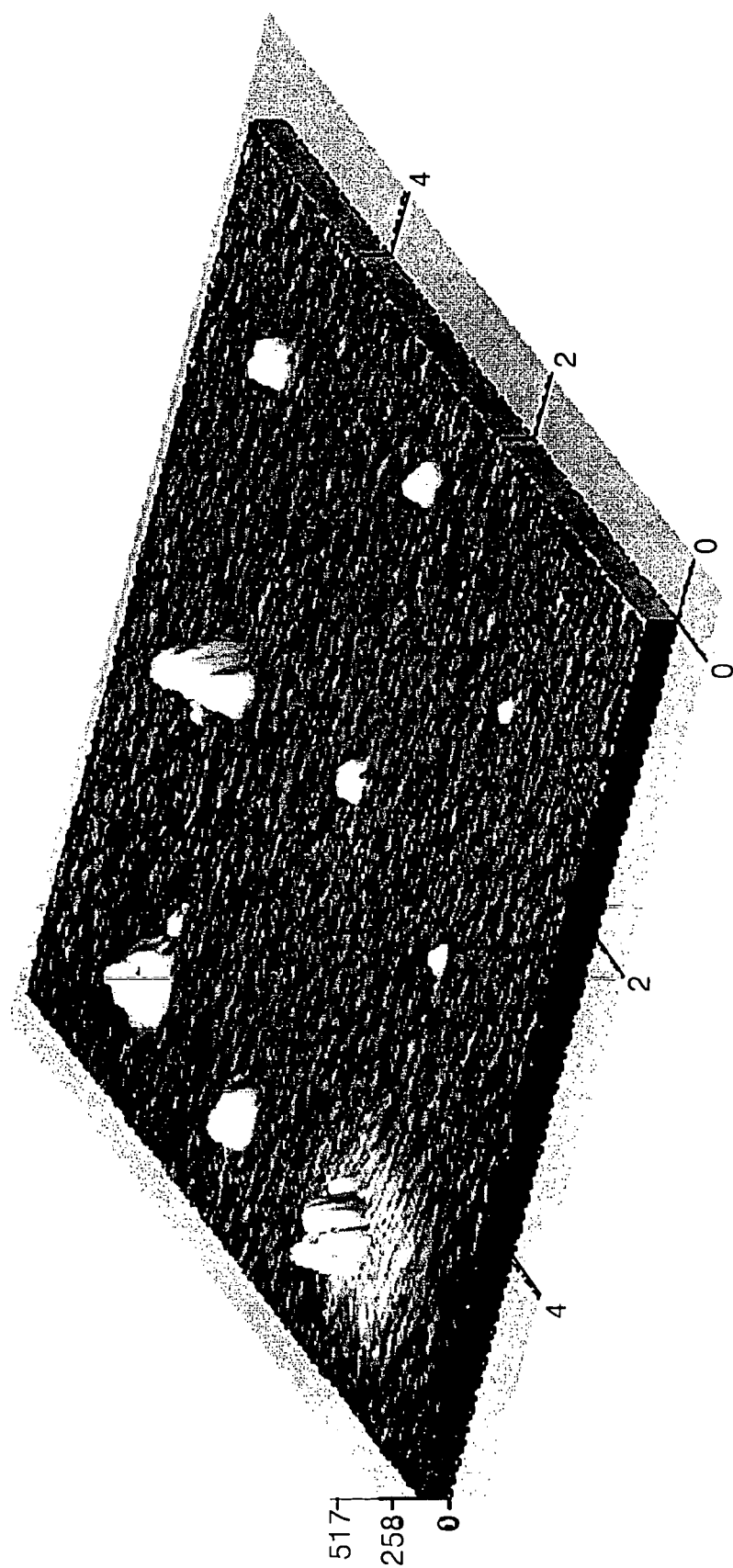
FIG. 3 shows an image of examples of various carbonaceous material spots formed in connection with various magnitudes of bias voltage applied across the space between the substrate and the tip according to the method illustrated in FIGS. 1A and 1B.

FIG. 3 is an image of various spots of the carbonaceous material formed when applying various levels of the bias voltage across the space between the substrate and the tip being read with the AFM. Here, it is shown that the spots of the formed carbonaceous material can be formed in various sizes according to the level of the applied bias voltage or the duration of applied bias voltage.

Therefore, in FIGS. 2A through 2D, the size of the spot of the carbonaceous material formed or eliminated can be controlled by changing the level or magnitude of the bias voltage as illustrated in FIG. 3. Particularly, the size of the spot can be controlled on the order of tens of nanometers. Accordingly, the present invention can be easily adapted and applied to the manufacture of a rewritable data storage of hundreds or more gigabyte (Gb) class.

Figure 4A:
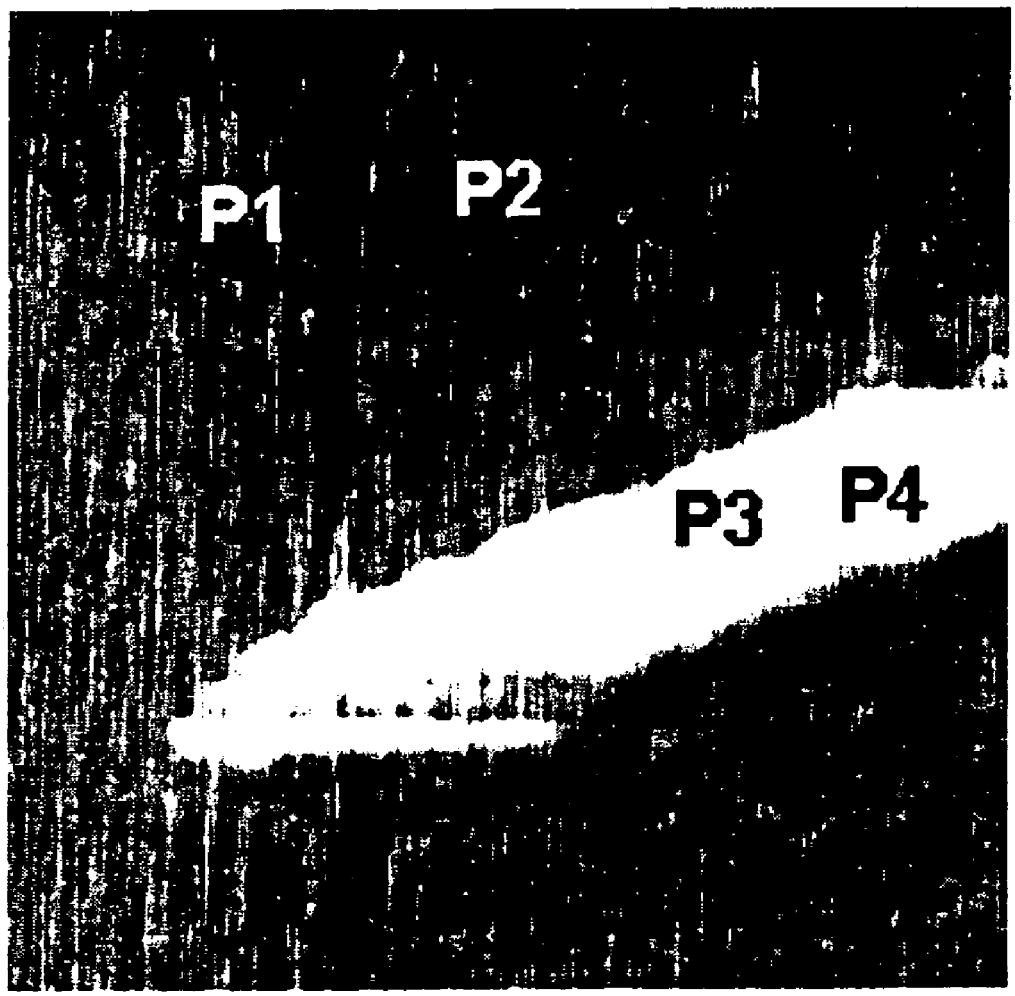
FIGS. 4A and 4B are graphs showing results of an Auger Electron Spectroscopy (AES) analysis used in obtaining an image of information written using the method illustrated in FIGS. 1A and 1B and the material constituents thereof.
Figure 4B:
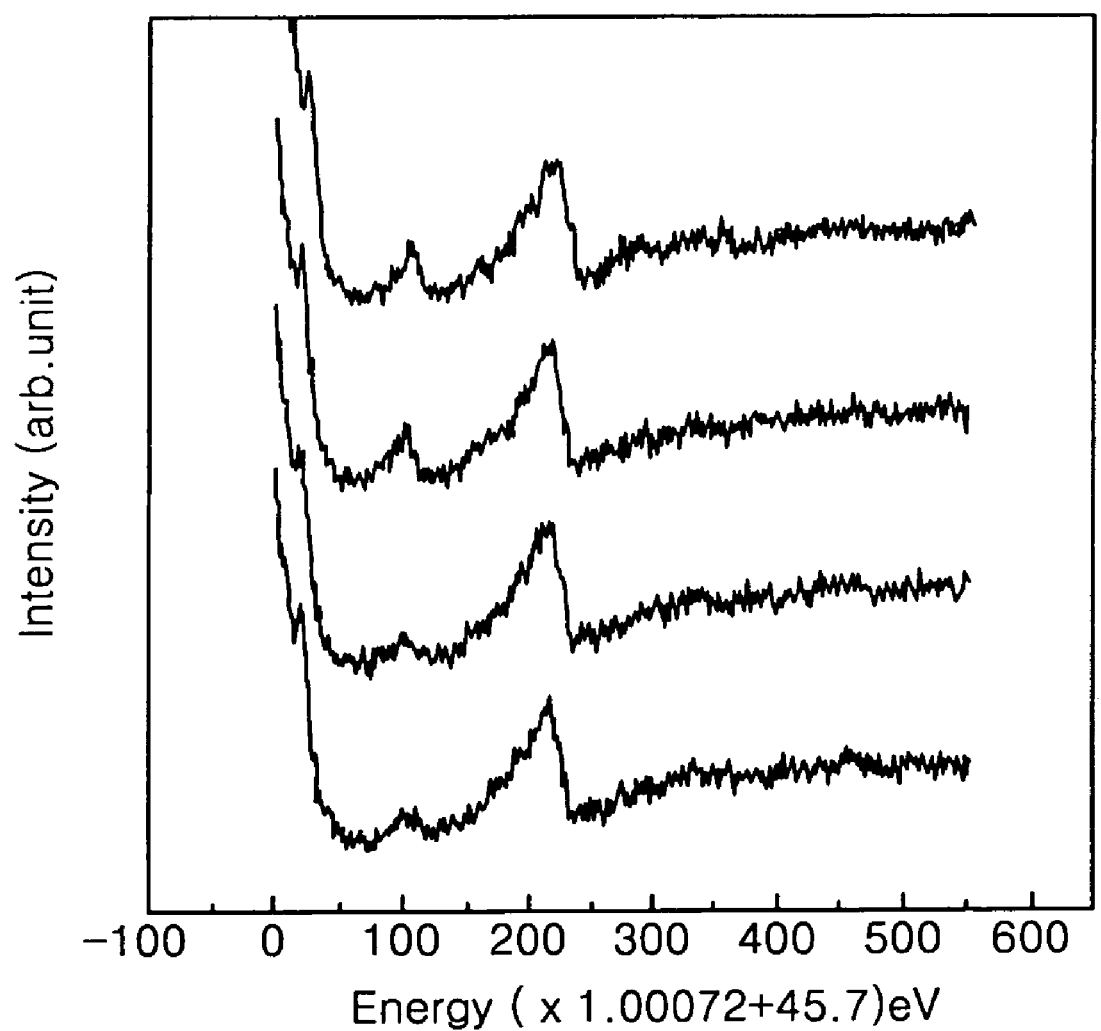

Referring to FIGS. 4A and 4B, the results of an Auger Electron Spectroscopy (AES) analysis will be described in order to ascertain material constituents of the written information. FIG. 4A is an image of a sample used for the AES analysis being read with the AFM, wherein a white part of size 3 μm×4 μm (P3, P4) is a place where the carbonaceous material is formed by the method previously described (where information is stored), and the conductive layer region where the carbonaceous material is not formed is indicated as P1, P2. AES spectrums indicated as P3 and P4 in FIG. 4B are the result of an AES analysis of a place where information is stored. AES spectrums indicated as P1 and P2 in FIG. 4B are the result of an AES analysis of the original Au layer where information is not stored.

In P1, P2 where information is not stored, a large quantity of Au and carbon constituents are detected, whereas in P3, P4 where information is stored, almost no Au is detected and only a large quantity of carbon constituents are detected. Therefore, it may be concluded that a rewritable data storage mechanism according to the present invention involves the local deposition/removal of carbonaceous material on the Au layer by the current induced electrochemical reaction as described above.

Figure 5A:
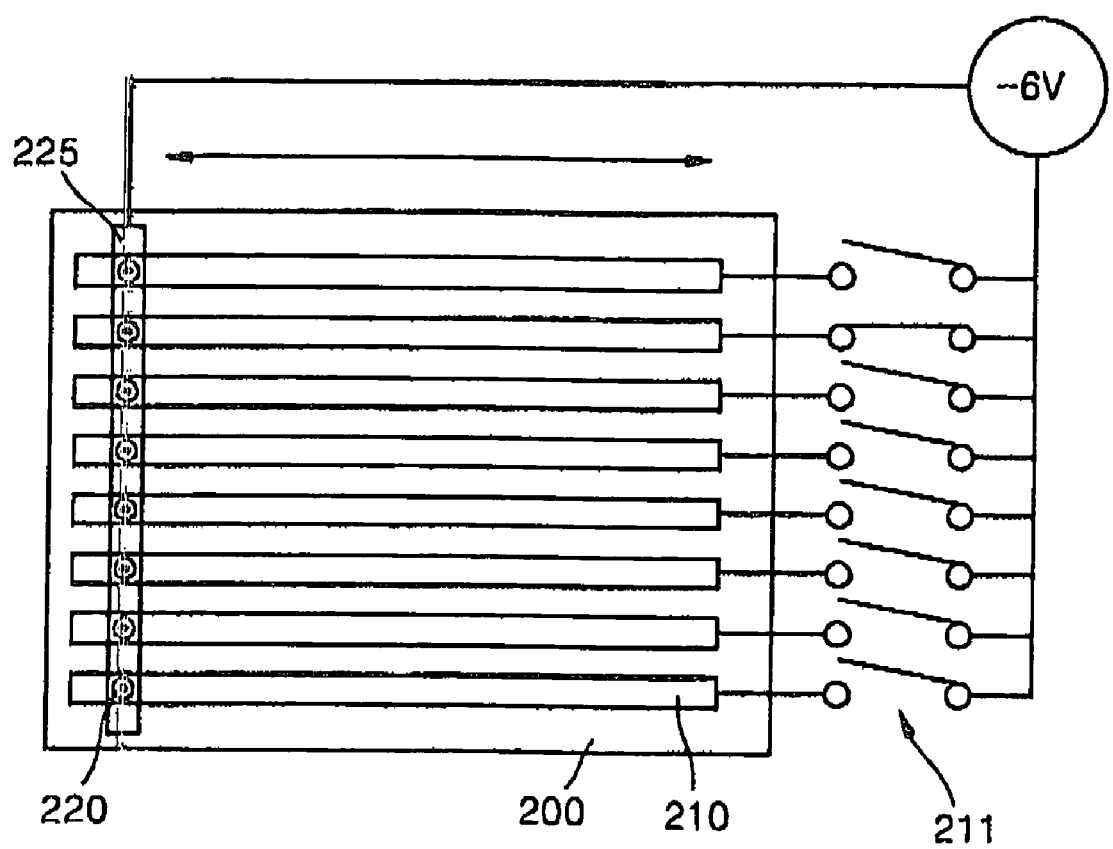
FIGS. 5A through 5C are schematic drawings showing an example of an application of the principles of the method of writing/reading in accordance with a preferred embodiment of the present invention, as illustrated in FIGS. 1A and 1B, as applied to a wide area rewritable data storage.
Figure 5B:
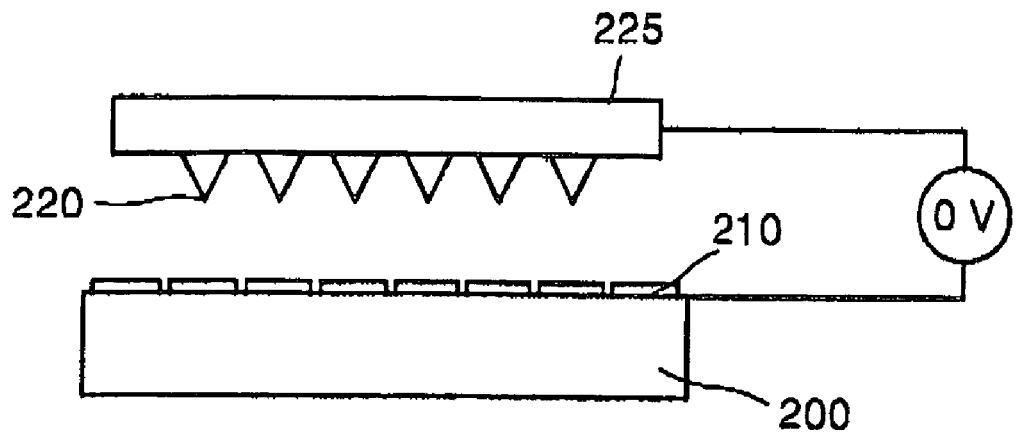
Figure 5C:
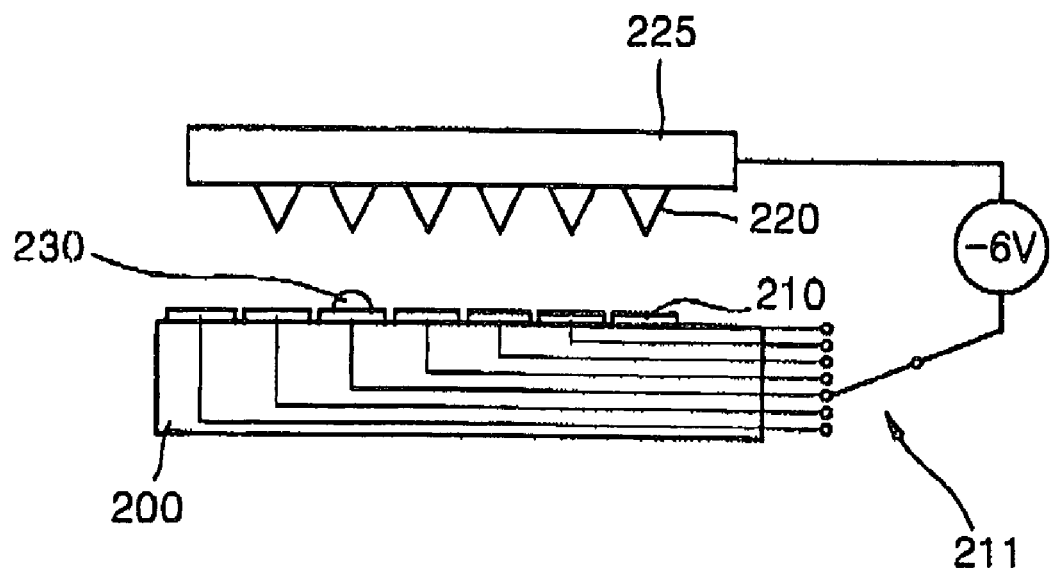

Referring to FIGS. 5A through 5C, an example of applying the principle of the writing/reading method to a wide rewritable data storage will now be described. As illustrated in FIG. 5A, striped conductive layer patterns 210 are formed on a substrate 200, a cantilever 225, in which a cantilever tip 220 is formed in an array, is installed above the conductive layer patterns to form a circuit, and then, the carbonaceous material can be formed in the desired place. Also, information of the desired place can be read by selecting a switch 211 and a position of the cantilever, and applying a voltage. That is, as illustrated in FIG. 5B, if the bias voltage is not applied across the space between the cantilever tip 220 and the conductive layer patterns 210, the carbonaceous material is not formed. However, as illustrated in FIG. 5C, if the cantilever tip 220, such as AFM tip, and the third conductive layer pattern 210 are selected and a bias voltage (−6 V) is applied, the carbonaceous material 230 is formed in the selected region of the selected third conductive layer pattern 210. Accordingly, even though the storage has a wide area, information can be written/read by accessing the desired region.

Also, a plurality of cantilevers, on each of which tips are formed in an array, may be formed so that a data storage capable being accessed while the cantilevers move only a short distance, can be manufactured.

As described above, a rewritable data storage using carbonaceous material according to the present invention writes or erases information. The carbonaceous material is formed by means of a current induced electrochemical reaction on the conductive layer, and the size and shape of the carbonaceous material is controlled by both the level of voltage and duration of voltage applied across the space between the cantilever tip and the conductive layer.

Therefore, because the data storage is rewritable but does not employ phase transformation, the writing/erasing endurance is enhanced, and the deterioration of the material features of the prior art with respect to a continuous write/erase cycle is solved, so that it can be semi-permanently used. Moreover, information can be stored and eliminated by creating or eliminating a structure on the order of tens of nanometers in size, so that a rewritable data storage capable of storing and rewriting over hundreds of gigabytes of information (Gb) maybe produced.

What is claimed is:

1. A rewritable data storage using a carbonaceous material comprising:
    a writing plate formed of a substrate, and a conductive layer deposited on the substrate; and
    a tip for forming or eliminating carbonaceous material in the form of spots on the writing plate, the spots representing information recorded on the conductive layer.

2. The rewritable data storage using a carbonaceous material of claim 1, wherein the substrate is formed of $SiO_2/Si$.

3. The rewritable data storage using a carbonaceous material of claim 1, wherein the conductive layer is formed of Au.

4. The rewritable data storage using a carbonaceous material of claim 1, wherein the tip is formed of Ti coated on a tip-shaped Si core.

5. A rewritable data storage using a carbonaceous material comprising:

a writing plate comprised of a substrate having striped conductive layer patterns formed on the substrate; and a tip disposed in an array having a regular interval corresponding to the striped conductive layer patterns along a cantilever extending across the striped conductive layer patterns in order to form or eliminate carbonaceous material in the form of spots, the spots representing information recorded on the striped conductive layer patterns.

6. The rewritable data storage using a carbonaceous material of claim 5, wherein the substrate is formed of $SiO_2/Si$.

7. The rewritable data storage using a carbonaceous material of claim 5, wherein the conductive layer is formed of Au.

8. The rewritable data storage using a carbonaceous material of claim 5, wherein the tip is formed of Ti coated on a tip-shaped Si core.

9. A method of writing/reading a rewritable data storage using a carbonaceous material, the rewritable data storage having a writing plate formed of a substrate with a conductive layer formed on the substrate and a tip for forming or eliminating a carbonaceous material in the form of spots representing information recorded on the conductive layer, the method comprising:

(a) writing information by applying a predetermined bias voltage to the space between the tip and the conductive layer and forming a carbonaceous material on the conductive layer;

(b) erasing the information by applying a voltage of reverse polarity to the bias voltage applied in step (a) to the space between the tip and the conductive layer, and eliminating the carbonaceous material already formed; and (c) reading the information by comparing topography between the conductive layer and the carbonaceous material.

10. The method of writing/reading the rewritable data storage using a carbonaceous material as claimed in claim 9, wherein, the size of spots of the carbonaceous material formed in step (a) is determined by controlling (1) the magnitude of the bias voltage applied across the space between the conductive layer and the tip and/or (2) the time duration for which the bias voltage is applied.

11. The method of writing/reading the rewritable data storage using a carbonaceous material as claimed in claim 9, wherein the size of spots of the carbonaceous material eliminated in step (b) is decided by controlling the magnitude of the bias voltage applied across the space between the conductive layer and the tip or the time duration for which the bias voltage is applied.

12. The writing/reading method of the rewritable data storage using a carbonaceous material as claimed in claim 9, wherein step (c) is performed using one of a capacitance difference, a resistance difference, a frictional coefficient difference, and a height difference between the conductive layer and the carbonaceous material.

13. A method of writing/reading a rewritable data storage using a carbonaceous material, the rewritable data storage including a writing plate comprising a substrate on which striped conductive layer patterns are formed by depositing a conductor on the substrate; and a tip disposed in an array having a regular interval to correspond to the striped conductive layer patterns in a cantilever extending across the striped conductive layer patterns for forming or eliminating a carbonaceous material in the form of spots representing information recorded on the conductive layer, including:

(a) writing information by positioning the cantilever, applying a predetermined bias voltage to the space between the cantilever tip and the selected conductive layer pattern and forming a carbonaceous material in the selected region of the selected conductive layer pattern;

(b) erasing the information by positioning the cantilever, applying a voltage of reverse polarity to the bias voltage applied in step (a) to the space between the cantilever tip and the selected conductive layer pattern, and eliminating the carbonaceous material already formed; and (c) reading the information by distinguishing topographical differences between the conductive layer patterns and the carbonaceous material.

14. The method of writing/reading of a rewritable data storage using a carbonaceous material as claimed in claim 13, wherein the size of spots of the carbonaceous material formed in step (a) is determined by (1) controlling the magnitude of the bias voltage applied across the space between the conductive layer patterns and the cantilever tip, and/or (2) the time duration for which the bias voltage is applied.

15. The method of writing/reading a rewritable data storage using a carbonaceous material as claimed in claim 13, wherein the size of spots of the carbonaceous material eliminated in step 13 is determined by controlling (1) the magnitude of the bias voltage applied across the space between the conductive layer patterns and the cantilever tip, and/or (2) the time duration for which the bias voltage is applied.

16. The method of writing/reading the rewritable data storage using a carbonaceous material as claimed in claim 13, wherein step (c) is performed using one of a capacitance difference, a resistance difference, a frictional coefficient difference, and a height difference between the conductive layer patterns and the carbonaceous material.

* * * * *